(12) United States Patent
Fukatsu

(10) Patent No.: US 7,154,920 B2
(45) Date of Patent: Dec. 26, 2006

(54) BROAD-BAND VARIABLE-WAVELENGTH LASER BEAM GENERATOR

(75) Inventor: Susumu Fukatsu, Tokyo (JP)

(73) Assignee: Japan Science and Technology Agency, Kawaguchi (JP)

( * ) Notice: Subject to any disclaimer, the term of this patent is extended or adjusted under 35 U.S.C. 154(b) by 344 days.

(21) Appl. No.: 10/484,811

(22) PCT Filed: Jul. 31, 2002

(86) PCT No.: PCT/JP02/07782

§ 371 (c)(1), (2), (4) Date: Jan. 30, 2004

(87) PCT Pub. No.: WO03/012544

PCT Pub. Date: Feb. 13, 2003

(65) Prior Publication Data

US 2004/0174914 A1    Sep. 9, 2004

(30) Foreign Application Priority Data

Jul. 31, 2001    (JP)    ............................. 2001-231555

(51) Int. Cl.
*H01S 3/10*    (2006.01)
*H01S 3/12*    (2006.01)
*H01S 3/00*    (2006.01)

(52) U.S. Cl. ................... 372/20; 372/29.02; 359/341.1

(58) Field of Classification Search .................. 372/21, 372/29.02, 29.022; 359/341.1–341
See application file for complete search history.

(56) References Cited

U.S. PATENT DOCUMENTS 4,784,450 A * 11/1988 Jain et al. .................... 359/332
5,862,162 A * 1/1999 Maeda .......................... 372/20
5,923,683 A   7/1999 Morioka et al.
6,396,574 B1 * 5/2002 Lee et al. .................... 356/73.1
6,407,869 B1 * 6/2002 Asami .......................... 359/641
6,625,182 B1 * 9/2003 Kuksenkov et al. ........... 372/19

FOREIGN PATENT DOCUMENTS

JP    03293788 A  * 12/1991

OTHER PUBLICATIONS

Ilev. I. et al., Highly efficient wideband continuum generation in a single-mode optical fiber by powerful broadband laser pumping. Applied Optics, May 20, 1996, vol. 35, No. 15, pp. 2548 to 2553.
Grigoryants, V.V. et al., Nonlinear conversion of laser radiation in optical fibers and its applications for spectral invertigation. Optical and Quantum Electronics, 1983, vol. 15, No. 4, pp. 363 to 365.

* cited by examiner

*Primary Examiner*—James Menefee
*Assistant Examiner*—Phillip Nguyen
(74) *Attorney, Agent, or Firm*—Oblon, Spivak, McClelland, Maier & Neustadt, P.C.

(57) ABSTRACT

There is provided a broadly tunable laser beam generator serving as a laser beam source which utilizes a nonlinear optical effect of a silica (glass) fiber and which is broadly tunable in the near-infrared region, having ultra-broad tunability which has not been easily achieved by known tunable lasers, and generating coherent light which can be continuously swept over the entire wavelength region with a simple mechanical operation of a single wavelength selecting element and which is emitted in a constant direction independent of its wavelength.

The laser beam source which utilizes a nonlinear optical effect of a silica optical fiber (8) and which is broadly tunable in the near-infrared region has ultra-broad tunability and generates coherent light which can be continuously swept over the entire wavelength region with a single wavelength selecting element (10).

3 Claims, 2 Drawing Sheets

F I G. 1
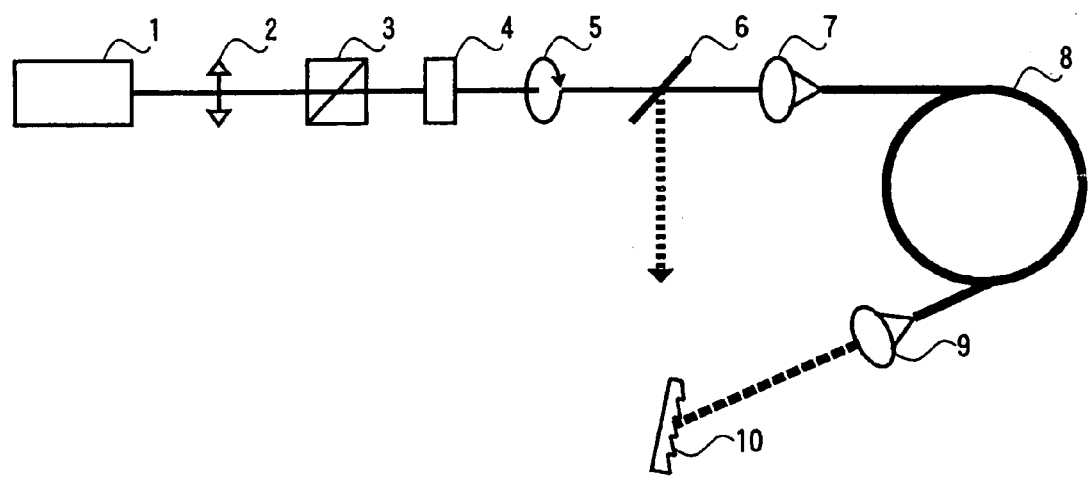

BROAD-BAND VARIABLE-WAVELENGTH LASER BEAM GENERATOR

TECHNICAL FIELD

The present invention relates to a broadly tunable laser beam generator.

BACKGROUND ART

In the fields of optics in general including spectroscopy and optical communications, a light source offering a broadband tunability has been eagerly desired. Although the term "broadband" is generic and defined only vaguely, it here points to a band from 800 to 1800 nm that is of importance in the fields of spectroscopy and optical communications. In many applications, an incandescent lamp or the like combined with a spectrometer has been the optimal choice as a broadly tunable light source; the intensity of light remains no more than a few tens of μW per 1 nm, and even worse, convergence of light is not as good as that of coherent light like laser radiation. This is solely attributable to incoherence of light generated in an incandescent lamp.

Driven by the same desire, several lasers as a coherent light source having a fair tunability have been developed. In fact, some of them have been put in practical use in the many and expanding fields of application.

DISCLOSURE OF INVENTION

Among those tunable lasers developed so far, a Ti-sapphire laser is a well-known example, which is capable of tuning 300 nm continuously. The widest tuning range is provided by an optical parametric oscillator (OPO) laser, which can go from the ultraviolet all the way to the infrared with the aid of the third-order nonlinearity in an optical crystal of macroscopic size. However, there are still problems associated with the OPO: wavelength sweep is not easy in the pump-light degenerate region, an oscillation linewidth is broad (>1 nm), an light-emitting direction varies with wavelength unless appropriate angle compensation is exercised, and very high-power pump light is required.

Meanwhile, fiber lasers utilizing an optical fiber as a broadband gain medium have been already on the market, such as a tunable Raman laser. For these commercial fiber lasers, a broad wavelength tuning range 1073 to 1600 nm is predicted according to literature values of tunability due to the third-order nonlinearity. However, the tuning range is deliberately limited to within 100 nm in practice as there is a trade-off between the broad tunability and small spectral linewidth. It is sometimes even required to designate a particular wavelength and thus the potential broad tunability is not taken advantage of.

In addition, it has been taken for granted that as long as stimulated Raman scattering is concerned, low-energy light (Stokes light or down-converted light) is what is mainly generated, and up-converted light (anti-Stoke light) is very unlikely and thus wavelength tuning is not allowed in the pump-light degenerate region as well as at the high energy side.

In view of the above-mentioned circumstances, it is an objective of the present invention to provide a broadly tunable laser beam generator serving as a laser beam source which utilizes a nonlinear optical effect of a silica (glass) optical fiber and which is broadly tunable in the near-infrared region, offering ultra-broadband tunability that has not been easily achieved by the known tunable lasers, and generating coherent light whose direction of emission does not depend on wavelength and which scans the entire wavelength region with a single wavelength selecting element.

In order to achieve the above objective, according to the present invention,

[1] a silica optical fiber having birefringence is used as a gain medium, and a non-linear optical effect of the fiber (stimulated Raman scattering and stimulated parametric four-lightwave mixing) is utilized;

[2] by using a pulse laser having an oscillating wavelength shorter than a cut-off wavelength as pump light, a gain spectrum continuously extending in the degenerate region in the vicinity of the pump light and also over both a shorter wavelength (anti-Stokes light) region and a longer wavelength (Stokes light) region with respect to a wavelength of the pump light is generated;

[3] a diffraction grating is used as a broadly tunable single wavelength selecting element;

[4] a collinear emitting configuration for generating a laser beam from an end of the fiber is employed; and

[5] a laser gain is obtained by passing light through the fiber twice without requiring pulse-tuning adjustment.

A tunable range of 800 to 1800 nm according to the present invention covers even 210 THz on an energy scale. Such a light source (laser) easily tunable across a broadband with direction of emission remaining collinear and configured in a simple geometry is unparalleled.

Here the term "collinear" means that light in the laser oscillator has a particular direction of emission regardless of wavelengths: light always emits from the end of the fiber so that it is oriented towards a fixed direction in space. This is well contrasted with the case of OPO. Since direction of emission of a laser beam generated in an OPO crystal often varies with wavelength as it is scanned, it is required to introduce a second crystal to compensate for the angular departure. This results in a complicated structure and operation. Even worse, the OPO still cannot get rid of the problem that the laser beam is not perfectly collinear.

BRIEF DESCRIPTION OF THE DRAWINGS

FIG. 1 is a diagrammatic view of a broadly tunable laser beam generator according to an embodiment of the present invention.

BEST MODE FOR CARRYING OUT THE INVENTION

An embodiment of the present invention will be described in detail.

Figure 2:
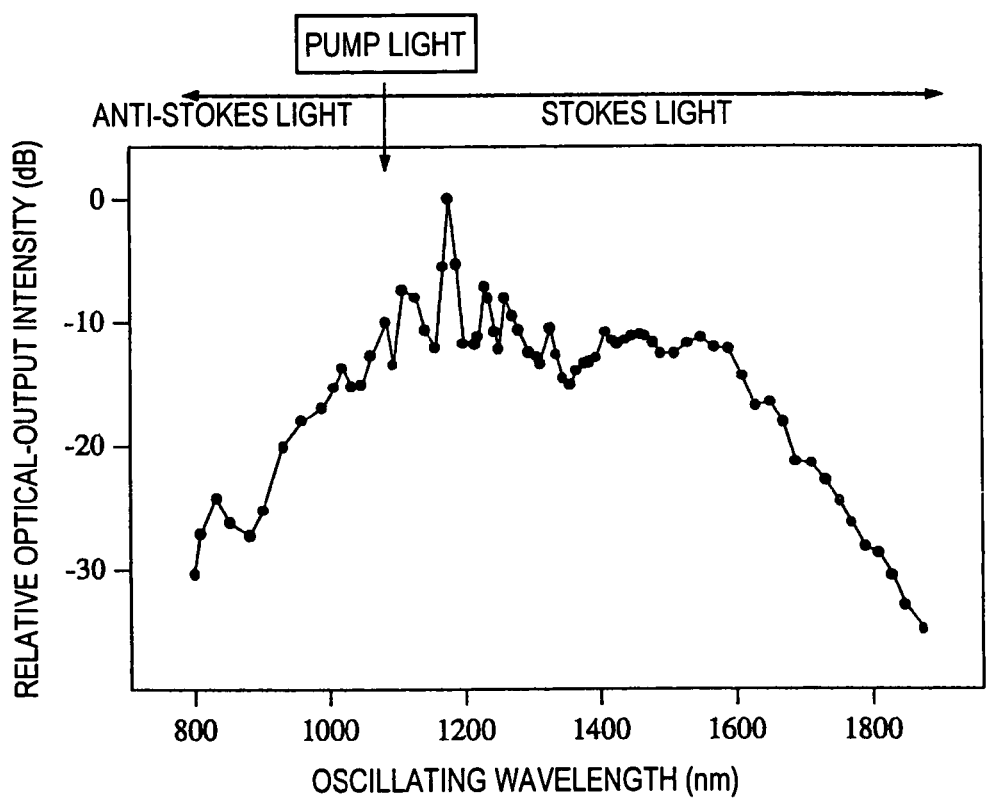
FIG. 2 is a diagram illustrating tuning characteristics according to the embodiment of the present invention.
Figure 3:
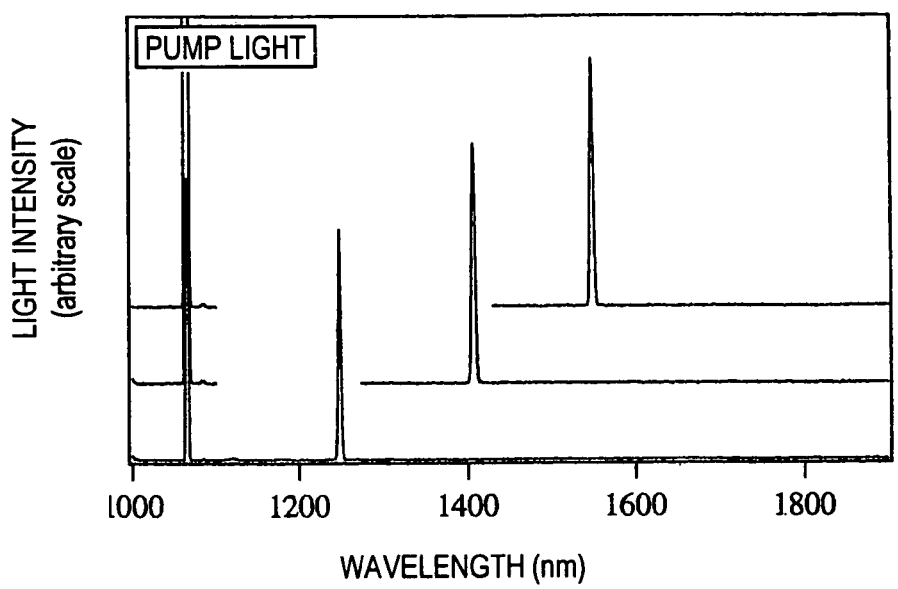
FIG. 3 is a diagram of single wavelength selection according to the embodiment of the present invention.

FIG. 1 is a diagrammatic view of a broadly tunable laser beam generator according to the embodiment of the present invention, FIG. 2 is a diagram illustrating tuning characteristics according to the embodiment of the present invention, wherein the horizontal and vertical axes respectively indicate an oscillating wavelength (in nm) and a relative optical-output intensity (in dB). FIG. 3 demonstrates specific examples of single-wavelength selection, wherein the horizontal and vertical axes respectively indicate a wavelength (in nm) and a relative optical-output intensity (on an arbitrary scale), and the three examples of wavelength selection shown have been shifted along the vertical axis for clarity. The peak at the extreme left indicates a pump laser beam as a reference.

In FIG. 1, the reference numeral 1 denotes a pump pulse laser, 2 denotes directions of polarized light of the pumping pulse laser 1, 3 denotes a polarization beam splitter, 4 denotes a quarter-wave plate, 5 denotes a direction of circularly polarized light generated by the quarter-wave plate 4, 6 denotes an output-coupling half-mirror, 7 and 9 denote collective collimator lenses, 8 denotes a silica optical fiber serving as a gain medium, and 10 denotes a diffraction grating serving as a single-wavelength selecting element.

Although the polarization beam splitter 3 and the quarter-wave plate 4 constitute an isolator to remove unwanted pump reflection that is fedback to the pump laser 1, they may be replaced with an alternate photonic device having the same function as them. In addition, even when the polarization beam splitter 3 and the quarter-wave plate 4 are removed, the generation characteristics of a broadband tunable laser beam according to the present invention is not affected.

A pulse beam emitted from the pump pulse laser 1 (with an oscillating wavelength of 1064 nm) (it may be a Q-switched or mode-locked pulse laser which can generate a high-power pulse beam, and more preferably, it may be the one with a pulse beam having an output intensity of 1 kW or more and having oscillating wavelengths shorter than a cut-off wavelength of the single-mode silica optical fiber 8 by about 10 to 20% in addition to 1064 nm) passes through the output-coupling half-mirror 6 and is incident on the silica optical fiber 8 serving as a gain medium via the collective collimator lens 7.

The silica optical fiber 8 is a single mode fiber having a birefringent characteristic, a cut-off wavelength of 1100 nm to 1300 nm, and a length of 100 m to 400 m. When a polarization-preserving fiber is used, the fiber length can be made even shorter. Also, in order to achieve this purpose, even a refractive-index-gradient-type multimode fiber (graded-index fiber) for communications, having 50 and 62.5 μm core diameters, can be used instead of a single mode fiber, aside from the fact that its output-light intensity characteristics is different from those of the single mode fiber.

While pulse light is propagating through the silica optical fiber 8, a nonlinear optical effect of silica glass allows stimulated Raman scattering and stimulated parametric four-wave mixing. Phase-matching conditions of the former are automatically satisfied with dispersion of phonons, and those of the latter is compensated for with modal dispersion of wavelengths shorter than the cut-off wavelength, caused by a waveguide.

The light emitted from the other end of the silica optical fiber 8 is converted into collimated light by the collective collimator lens 9 and is incident on the diffraction grating 10, and only first-order diffracted light is selectively fed back to the silica optical fiber 8. Preferably, the diffraction grating (single-wavelength selecting element) 10 maintains a high reflectance in a working wavelength band in order to improve a feedback efficiency.

To be specific, with 830 to 1000 nm in blaze wavelength, 600 to 1200 lines/mm, 10×10 mm$^2$ to 25×25 mm$^2$, and gold or aluminum coating, the diffraction grating offers an excellent result. Alternatively, a combination of a narrow-linewidth band-pass filter and a total reflection mirror may be used.

The fed back light having a specific wavelength is amplified by obtaining a gain while propagating through the fiber twice in both directions, is emitted from the one end of the fiber on which it was first incident, is converted into collimated light by the collective collimator lens 7, and is emitted as an output light beam by the output-coupling half-mirror 6. It is emitted in a constant direction independent of its wavelength, that is, it becomes collinear.

Although the highest output is in principle obtained when the reflectance of the output-coupling half-mirror 6 is 50%, it may be 10 to 50%.

Measured results of light outputs in FIG. 2 are shown by relative intensities normalized by one of the measured results of 3 mW at 1178 nm. An absolute output of a laser according to the present invention can be increased substantially in proportion to a pump intensity. As is obvious from FIG. 2, ultra-broadband tunability lies from 800 nm to 1875 nm, and a Raman and four-wave mixing gear cannot be primarily expected out of this wavelength region.

As single-wavelength selection characteristics is shown in FIG. 3, with the above-described structure, a linewidth (full width at half maximum) of 1 nm or less is obtained, and the linewidth can be further narrower in reverse proportion to the grooved line density of the diffraction grating used for feedback of light.

Meanwhile, the present invention is not limited to the foregoing embodiment, and, since a variety of modifications are possible based on the spirit of the present inventions, these modifications shall not be excluded from the scope of the present invention.

As described above in detail, according to the present invention, a laser beam generator (coherent light source) which is tunable in a broadband can be constructed. A tunable region of 800 to 1875 nm is useful in a very wide range and immediately available as an excitation light source for spectroscopy including a solid state matter, and also covers all wavelength bands of 830 nm, 1310 nm, 1480 nm, and 1500 to 1600 nm which are important in optical communications. Especially, in the latter case, although an efficiency of coupling the light source to a fiber is vital, since a laser beam is emitted from the fiber itself, its coupling efficiency is about twice as much as that of spatial beam coupling, and also it is advantageous from the view point of maintenance because of no loss caused by scattering.

Also, the generator has a simpler structure than an optical parametric oscillator (OPO), collinearly emits light independent of its wavelength, and also easily performs wavelength selection.

INDUSTRIAL APPLICABILITY

A broadly tunable laser beam generator according to the present invention is suitable as a coherent, broadband tunable light source of a fiber-emitting-type in the field of spectroscopy and as a coherent tunable light source having a fiber-pigtail specification in the field of optical communications.

The invention claimed is:

1. A broadly tunable laser beam generator comprising:
a pump pulse laser;
an output-coupling half-mirror configured to pass a pulse beam emitted from the pump pulse laser therethrough;
a silica optical fiber configured to receive the pulse beam from the output-coupling half-mirror via a first collective collimator lens, the silica optical fiber having a birefringence and a cut-off wavelength from 1100 to 1300 nm; and
a single-wavelength selecting element configured to receive the beam emitted from the silica optical fiber via a second collective collimator lens and feeding back a light with a specific wavelength, wherein the feedback light with the specific wavelength is received by the silica optical fiber via the second collective collimator lens, amplified to obtain a gain while propagating through the fiber twice, emitted from the fiber, converted into collimated light by the first collective collimator lens, and emitted from the output-coupling half-mirror as an output light beam.

2. The broadly tunable laser beam generator according to claim 1, wherein the tunability is completely continuous to a degenerate region close to the pump light.

3. The broadly tunable laser beam generator according to claim 1, wherein by coupling a pulse laser beam source with an end face of the fiber so as to input a pulse laser beam having a short wavelength close to the cut-off wavelength into the end face of the fiber as pump light, stimulated Raman scattering and stimulated parametric four-lightwave mixing occur in the silica fiber so as to provide a gain spectrum continuously extending over both shorter and longer wavelength regions with respect to a wavelength of the pump light, and consequently to provide ultra-broadband tunability, the ultra-broad tunability lying from 800 nm to 1875 nm.

* * * * *